Patented May 21, 1940

2,201,535

UNITED STATES PATENT OFFICE 2,201,535

LIPOPHILIC-HYDROPHILIC DERIVATIVES OF THIO COMPOUNDS

Benjamin R. Harris, Chicago, Ill.

No Drawing. Application August 7, 1937, Serial No. 157,949

11 Claims. (Cl. 260—400)

My invention relates to a new class of chemical substances. It is more particularly concerned with a class of chemical substances having the properties of interface modifiers when employed in treating baths.

An object of my invention is accordingly the provision of a new class of chemical substances.

Another object is the production of a class of chemical substances having utility as interface modifying agents.

Another object is the provision of treating baths comprising members of the new class of substances.

Many of the substances of my invention have useful applications in the arts where frothing, wetting, penetrating, detergent, emulsifying, and other interface modifying functions are required. I may use them in treating baths which contain aqueous media with or without other reagents for the treatment of textile fabrics, leather, mineral ores, etc. They may be employed in the treatment of wool, the dyeing of textiles, and they may be employed in conjunction with color discharging agents such as sodium sulphoxylate and sulphites, for the flotation of ores to separate mineral values from the gangue, for stuffing leather, for dye leveling, for decreasing the spattering of margarine, and for other similar purposes.

The substances of my invention are, in general, possessed of at least two groups, one having a hydrophile function and the other having a lipophile function in the molecule. The hydrophile function is performed preferably by an oxygenated radical or an oxygenated inorganic acid such as hydroxyl, sulphate, sulphonic, phosphate or phosphonic groups although, as will be seen hereinafter, the hydrophile function may be performed by a nitrogen atom to which may be attached an anion such as chlorine, bromine, iodine and the like. The lipophile group is a group having a definite affinity for oils and fats and comprises either an alkyl, aralkyl, aryl, ether, or ester group suitably linked to a sulfur atom. The lipophile group possesses predominantly hydrocarbon characteristics and, in general, is derived from fats, oils, waxes, mineral oils, other hydrocarbons, and the like. Ordinarily, the straight chain aykyl or acyl radicals are preferred since such radicals possess stronger lipophilic properties than the aromatic radicals such as benzene and naphthalene radicals even though the carbon content of the aliphatic and aromatic radicals may be the same. I do not, however, exclude the utilization of aromatic or hydroaromatic radicals as lipophilic groups although, as stated, the aliphatic are much preferred.

Many of the compounds of my invention may be represented by the general formula

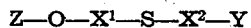

wherein $X^1$ and $X^2$ represent alkylene or substituted alkylene groups, Z represents a lipophilic radical, preferably aliphatic, as, for example, a higher molecular weight acyl, alkyl, aryl or aralkyl radical, and Y represents a hydrophilic group such as a sulphate, sulphonic, phosphate, pyrophosphate, tetraphosphate, phosphonic, lower molecular sulpho-carboxylic acid such as sulpho-acetate, sulpho-propionate, sulpho-butyrate, quaternary ammonium and other hydrophilic nitrogenous and non-nitrogenous groups.

Others of my compounds may contain more than one sulphur atom and may be represented by the general formula

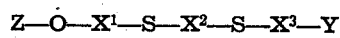

wherein Z, $X^1$, $X^2$ and Y are the same as represented above and $X^3$ is also an alkylene or substituted alkylene group.

It is evident from a consideration of the above general formulae that the compounds of my invention are sulphur-containing compounds wherein the sulphur atom is divalent and attached thereto is a radical containing a hydrophile group and another radical containing a lipophile group. As will be seen from the examples hereinafter set forth, the hydrophilic group appears preferably at or near only one end of the molecule as distinguished from being present, say, in the middle of the molecule. In order for the hydrophilic group to exert its hydrophilic properties to any noticeable extent so that the compounds readily can orientate themselves at water-oil interfaces or water-air interfaces or at interfaces of other materials in connection with which my compounds are used, the hydrophilic radical should be disposed at or near only one end of the molecule. It will be appreciated that with increasing lipophile mass the molecule tends to become oil-soluble and tends to alter its interface modifying properties. In most cases a proper balance must be struck between the lipophile mass, the character of the lipophile group and the nature and mass of the hydrophile group which is linked thereto, in order to obtain maximum interface modifying potency. Too great excess of lipophile or hydrophile characteristics in the molecule tends to diminish the value of the compound as an interface modifying agent although it may possess desirable properties for other purposes.

The following are examples of compounds coming within the class of substances of my invention:

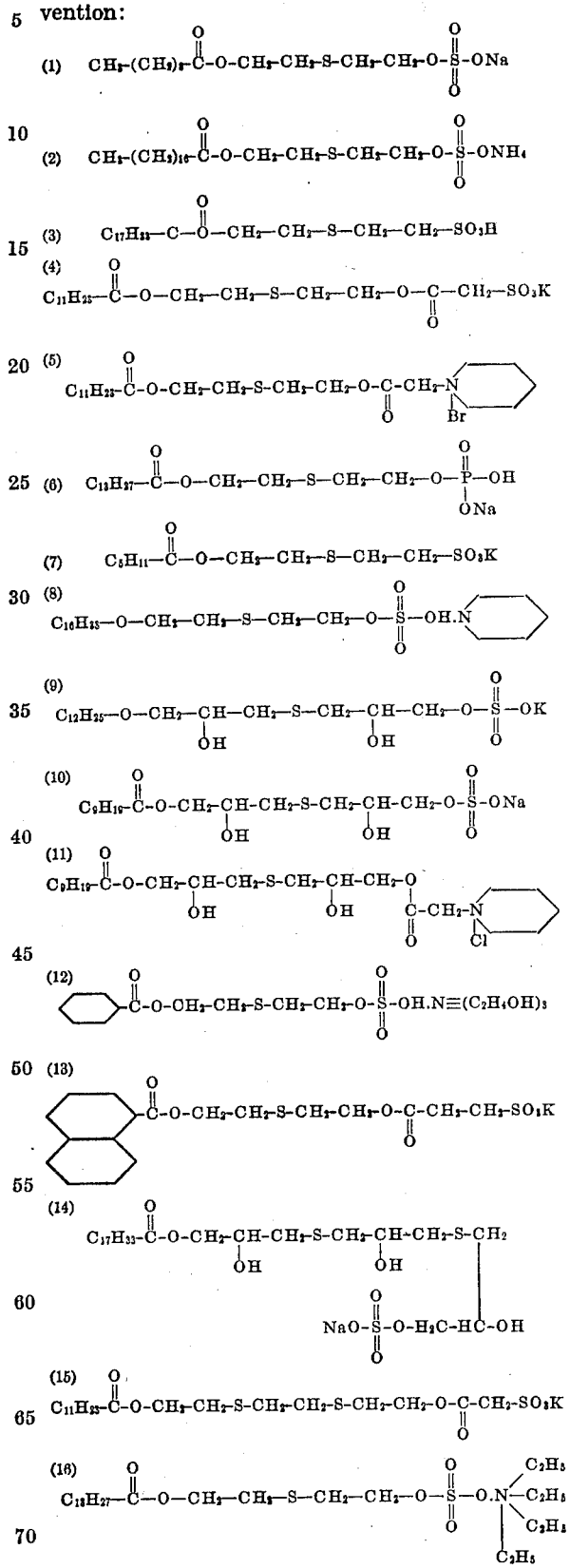

The sulphides which may be utilized in the preparation of the compounds of my invention may be derived in various ways in accordance with procedures known in the art. Thus, for example, ethylene may be reacted with sulphur chloride ($S_2Cl_2$) to produce the compound

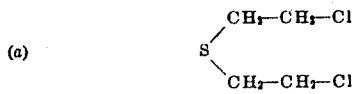

This compound (di-chlor-di-ethyl sulphide) can then be reacted with a salt of a higher fatty acid or a soap in accordance with the following reaction

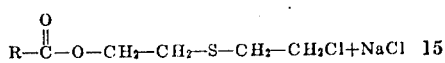

The product (b), washed free of NaCl if desired, may then be reacted with an alkali metal sulphite or ammonium sulphite to produce the corresponding sulphonic derivative or may be reacted with pyridine or the like to produce compounds in accordance with the following equations:

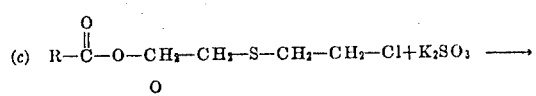

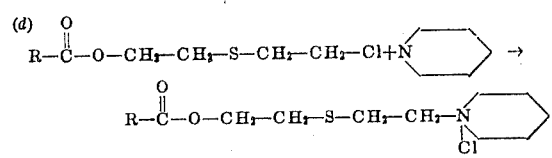

The following examples are illustrative of methods of producing various of the compounds falling within the scope of my invention. It will be understood, however, that said examples are given only by way of illustration and are not to be construed as limitative of my invention. It will be appreciated that the invention is susceptible of variation and modification, particularly with regard to the reacting ingredients, the proportions employed, the time and temperature of reaction, the exact mode of procedure, etc. All such variations I regard within the skill of chemists versed in the art in the light of my teachings herein and, therefore, within the scope of my invention.

*Example A*

In order to prepare the compound

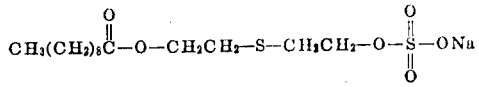

10.2 grams of decanoyl chloride were added slowly, with cooling, to 25 cc. of pyridine. 6.1 grams of thiodiglycol were dissolved in 15 cc. pyridine. The decanoyl chloride-pyridine mixture was then added slowly to the thiodiglycol mixture with vigorous stirring while cooling in a cold water or ice bath. The reaction mixture was permitted to stand for about 24 hours.

To the above reaction mixture there was then added slowly, with vigorous stirring and cooling in a cold water or ice bath, a previously prepared mixture of 3.6 cc. of chlorsulfonic acid which had been added slowly with stirring and cooling to 60 cc. of pyridine. The final reaction mixture was then permitted to stand over night after which it was heated to about 40 degrees C. for 15 minutes and then all of the pyridine was distilled off at 40 degrees C. in a vacuum. The product was then washed twice with petroleum ether and finally evaporated to dryness. The product was then redissolved in water and titrated with sodium hydroxide solution to render it neutral to phenolphthalein. The solution was then evaporated to dryness.

The resulting product was soluble in water, foamed excellently even when acid or calcium or magnesium ions were added to the water, showed good detergent properties, substantially reduced the surface tension of water, and gave a definite anti-spattering test when admixed with an otherwise untreated margarine.

Example B

To prepare the compound

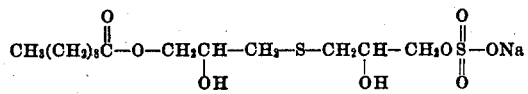

10.2 grams of decanoyl chloride were admixed with 25 cc. of pyridine, 9.1 grams of thiodiglycerol were admixed with 15 cc. of pyridine and 3.6 cc. of chlorsulfonic acid were admixed with 60 cc. pyridine, the procedure followed being identical with that described hereinabove in Example A.

The resulting compound was soluble in water and showed substantially the same kinds of properties as did the product resulting from the practice of the process of Example A.

Example C

To prepare thiodiglycolmonostearate, represented by the following formula:

130 parts of thiodiglycol were dissolved in an equal weight of pyridine. Stearyl chloride was then added dropwise to the solution of thiodiglycol and pyridine until 303 parts of the stearyl chloride were added, the reaction vessel being kept in an ice water bath during the addition of the stearyl chloride and the mixture was continually stirred. After the addition of the stearyl chloride was completed, the reaction mixture was permitted to stand for about 24 hours at room temperature. The product was then washed several times with hot water until the fatty layer was substantially free from pyridine. The product was then dried in an oven at 105 degrees C. At room temperature, it was a solid substance which was easily crushed to a white powder. This compound can be reacted with chlorsulphonic acid or other sulphonating or sulphating agents or can be otherwise treated to introduce a hydrophilic group therein.

Example D

To prepare thiodiglycolmonooleate, corresponding to the following formula

737 parts of thiodigylcol were mixed with 904 parts of oleic acid and the mixture was heated at 220 degrees C., with stirring, for about 3 hours, until substantially all of the free fatty acid had entered into combination with the thiodiglycol. The resulting ester was then washed a few times with hot water in order to remove the excess of thiodiglycol and the product was finally dried at 100 degrees C. It was of medium brown color and had a characteristic sulphur-compound odor. As in the case of the compound of Example C, hydrophilic derivatives can be prepared by reaction with phosphoric acids, P₂O₅, sulphonating and sulphating agents and the like.

Example E

To prepare the compound

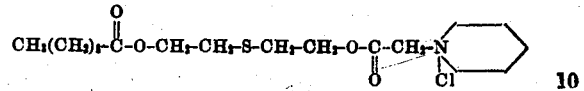

10.2 grams of decanoyl chloride were added slowly to 6.1 grams of thiodiglycol in 25 cc. of pyridine and the resulting mixture was allowed to stand at room temperature for approximately 24 hours after which it was warmed to between 50 degrees C. and 60 degrees C. for a few minutes to complete the reaction.

The reaction mixture was then cooled in an ice bath and 5.7 grams of chloracetyl chloride were added dropwise, the reaction mixture being allowed to stand for a considerable period of time until the reaction was completed. The product obtained was washed three times with petroleum ether to remove excess pyridine.

The resulting product was water soluble, foamed well in water, and substantially reduced the surface tension of water.

Example F

To prepare the compound

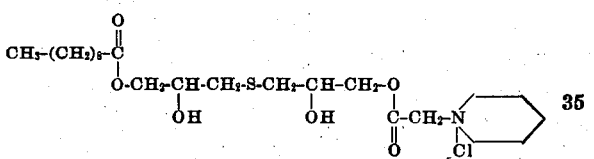

the process was carried out in exactly the same way as described in Example E with the exception that 9.1 grams of thiodiglycerol were substituted for the 6.1 grams of thiodiglycol of Example E.

Example G

To prepare the compound

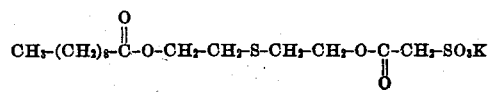

10.2 grams of decanoyl chloride were added dropwise at ice bath temperatures to a previously prepared mixture of 6.1 grams of thiodiglycol and 25 cc. of pyridine. The reaction mass was allowed to stand at room temperature for about 24 hours, warmed to between 40 degrees C. and 50 degrees C. to complete the reaction, and was then washed free of pyridine with petroleum ether.

The resulting dry ester was then dissolved in chloroform and 5.7 grams of chloracetyl chloride were added dropwise, while maintaining the chloroform solution in an ice bath, and then the reaction mass was permitted to stand at room temperatures in order to complete the reaction. The chloroform was then evaporated off and 45 cc. of water containing 16 grams of potassium sulfite were added thereto and heated and stirred to convert the chlorine group to a sulphonic acid group.

The product had the same desirable kind of properties which were described above in connection with Examples A and B.

I may select many different groups of lipophile materials for the lipophile portion or portions of the compounds of my invention. For example, the lipophile group may include any organic acid group, particularly fatty acid groups having preferably at least 6 and up to 18 carbon atoms such as the fatty acid radicals of the following acids: caproic, capric, caprylic, higher molecular weight saturated and unsaturated aliphatic and fatty acids including palmitic acid, stearic acid, lauric acid, melissic acid, oleic acid, myristic acid, ricinoleic acid, linoleic acid, mixed fatty acids derived from animal or vegetable fats and fish oils such as lard, oleo oil, coconut oil, corn oil, cottonseed oil, partially or completely hydrogenated vegetable oils such as cottonseed oil, corn oil, sesame oil and acids of various waxes such as beeswax, montan wax, and carnauba wax, hydroaromatic acids such as abietic acid, aromatic acids such as benzoic acid, benzoylbenzoic acid, naphthoic acid, toluic acid, and other acids such as naphthenic acids. Similarly, the lipophile group may be an alkyl radical derived from an alcohol corresponding to any of the preceding acids, such as octanol, cetyl alcohol, stearyl alcohol, oleyl alcohol, lauryl alcohol, higher saturated and unsaturated aliphatic alcohols derived from natural fats and oils including sperm oil, wool fat alcohols such as cholesterol, etc.

The divalent sulphur group or groups which link the lipophile and hydrophile portions of the molecule may be derived from thio-polyglycols such as thiodiglycol, thiopolyglycerols such as thiodiglycerol and similar thio compounds corresponding to ethereal polycompounds of polyhydroxy substances such as sugars, sugar alcohols, glycols, glycerol, hydroxycarboxylic acids such as mucic acid, tartaric acid, saccharic acid, gluconic acid, glucuronic acid, gulonic acid, mannonic acid, trihydroxyglutaric acid, glyceric acid, and the like, as well as carboxylic oxidation products of polyglycerols the corresponding thio derivatives of which may be represented by the formulae:

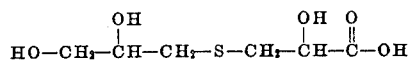

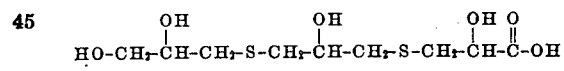

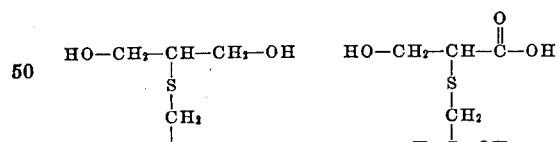

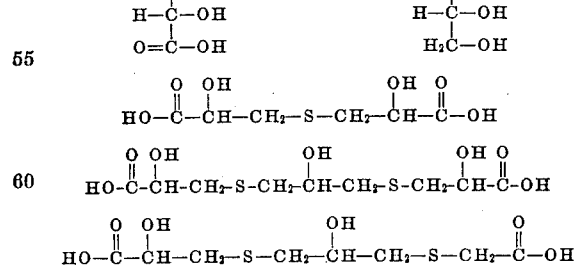

While I have gone into considerable detail in explaining my invention, the scope thereof is not to be restricted except by the claims.

Wherever the term "higher" is employed as referring, for example, to "higher molecular weight" acids or the like, it will be understood to mean at least six carbon atoms and, concomitantly, the word "lower" will be understood to mean less than six carbon atoms.

What I claim as new and desire to protect by Letters Patent of the United States is:

1. Chemical compounds corresponding to the general formula $$Z-O-X^1-S-X^2-Y$$

wherein $X^1$ and $X^2$ represent members selected from the class consisting of alkylene and substituted alkylene groups, Z represents a lipophilic group containing at least six carbon atoms, and Y represents a hydrophilic group.

2. Chemical compounds corresponding to the general formula $$Z-O-X^1-S-X^2-Y$$

wherein $-X^1-S-X^2-$ represents a radical selected from the group consisting of radicals of thiodiglycol and thiodiglycerol, Z represents a lipophilic group containing at least six carbon atoms and Y represents a hydrophilic group.

3. Chemical compounds in accordance with claim 1, wherein Z represents an aliphatic acyl radical containing at least six carbon atoms.

4. Chemical compounds in accordance with claim 1, wherein Z represents a fatty acid acyl radical containing between six and eighteen carbon atoms.

5. Chemical compounds in accordance with claim 1, wherein Y represents a hydrophilic group selected from the class consisting of oxygenated sulphur-containing and oxygenated phosphorus-containing radicals.

6. Chemical compounds in accordance with claim 1 wherein Y represents a hydrophilic nitrogenous radical.

7. Chemical compounds corresponding to the general formula

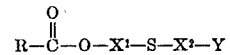

wherein R represents a straight chain aliphatic hydrocarbon radical containing at least five carbon atoms, $X^1$ and $X^2$ represent members selected from the class consisting of alkylene and substituted alkylene groups, and Y represents the radical

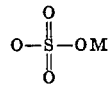

wherein M is a cation.

8. Chemical compounds corresponding to the general formula

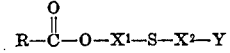

wherein R represents a fatty acid hydrocarbon radical containing at least six carbon atoms and Y represents the radical

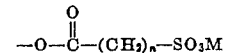

in which M is a cation and $n$ represents from 1 to 6.

9. Chemical compounds corresponding to the general formula

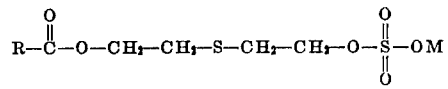

wherein R represents a fatty acid hydrocarbon radical containing at least six carbon atoms and M represents an alkali metal.

10. Chemical compounds corresponding to the general formula $$Z-O-(X^1-S)_n-X^2-Y$$

wherein $X^1$ and $X^2$ represent members selected from the class consisting of alkylene and substituted alkylene groups, Z represents a lipophilic group containing at least six carbon atoms, Y represents a hydrophilic group, and $n$ is a small whole number.

11. Chemical compounds corresponding to the general formula $$Z-O-(X^1-S)_n-X^2-Y$$

wherein $X^1$ and $X^2$ represent members selected from the class consisting of alkylene and substituted alkylene groups, Z represents an aliphatic acyl radical containing at least six carbon atoms, Y represents a hydrophilic group, and $n$ is one or two.

BENJAMIN R. HARRIS.